(12) United States Patent
Vadella

(10) Patent No.: US 11,507,877 B2
(45) Date of Patent: Nov. 22, 2022

(54) APPLICATION FUNCTIONALITY OPTIMIZATION

(71) Applicant: Autodesk, Inc., San Francisco, CA (US)

(72) Inventor: Kenneth Alexander Vadella, West Bloomfield, MI (US)

(73) Assignee: AUTODESK, INC., San Francisco, CA (US)

( * ) Notice: Subject to any disclaimer, the term of this patent is extended or adjusted under 35 U.S.C. 154(b) by 334 days.

(21) Appl. No.: 16/352,375

(22) Filed: Mar. 13, 2019

(65) Prior Publication Data

US 2020/0293943 A1    Sep. 17, 2020

(51) Int. Cl.
*G06N 20/00* (2019.01)
*G06N 5/04* (2006.01)

(52) U.S. Cl.
CPC ............. *G06N 20/00* (2019.01); *G06N 5/047* (2013.01)

(58) Field of Classification Search
None
See application file for complete search history.

(56) References Cited

U.S. PATENT DOCUMENTS

| 10,171,565 B2* | 1/2019 | Moon | H04L 43/08 |
| 10,798,207 B2* | 10/2020 | Susarla | H04L 47/78 |
| 2016/0063282 A1* | 3/2016 | Shani | G06F 9/38 717/121 |
| 2016/0124839 A1* | 5/2016 | Mordo | G06F 11/3664 717/124 |
| 2016/0357660 A1* | 12/2016 | Dean | G06F 8/00 |
| 2018/0121045 A1* | 5/2018 | Mizrahi | G06F 3/0481 |
| 2018/0159946 A1* | 6/2018 | Barreto | H04L 67/18 |

OTHER PUBLICATIONS

Explore how to progressively expose your features in production for some or all users (Microsoft) taken from https://docs.microsoft.com/en-us/azure/devops/migrate/phase-features-with-feature-flags?view=azure-devops (Year: 2018).*
Feature Toggles are one of the Worst kinds of Technical Debt (Jim Bird) taken from https://dzone.com/articles/feature-toggles-are-one-worst (Year: 2014).*
Feature Toggles (aka Feature Flags) taken from https://martinfowler.com/articles/feature-toggles.html (Year: 2017).*

(Continued)

*Primary Examiner* — Casey R. Garner
(74) *Attorney, Agent, or Firm* — Gates & Cooper LLP

(57) ABSTRACT

A method, apparatus, and system provide the ability to optimize execution of an application. An application is acquired. The application includes functions, and each function has a corresponding feature flag that determines whether the corresponding function is executed. Execution conditions of execution of the application are monitored at run-time (in a machine learning module). The machine learning module recognizes a pattern relating to the execution conditions to determine a stress relating to the execution of the application. During execution of the application, the machine learning module toggles the feature flags based on the pattern and the stress such that the corresponding functions do not execute.

18 Claims, 4 Drawing Sheets

(56) References Cited

OTHER PUBLICATIONS

FeatureFlags, retrieved via Internet Archive on Feb. 21, 2019, retrieved from https://web.archive.org/web/20190221224915/https://featureflags.io/feature-flags/ (Year: 2019).*

Roussy retrieved from https://marcroussy.com/2018/02/01/when-to-use-feature-toggles/ (Year: 2018).*

"Feature Flags, Toggles and Controls", The Wayback Machine, https://web.archive.Org/web/20190221224915/https://featureflags.io/feature-flags/, 2019, pp. 1-7.

Roussy, M., "When to use Feature Toggles", retrieved from https://marcroussy.com/2018/02/01/when-to-use-feature-toggles/, 2018, pp. 1-5.

* cited by examiner

APPLICATION FUNCTIONALITY OPTIMIZATION

BACKGROUND OF THE INVENTION

1. Field of the Invention

The present invention relates generally to application responsiveness, and in particular, to a method, system, apparatus, and article of manufacture for controlling and optimizing application functionality at execution time based on machine learning.

2. Description of the Related Art

Computer software is often distributed on the web/Internet and consist of separate components that are programmed by separate people (within an organization) that run independently from each other at disparate locations throughout the world. Further, applications may commonly have pieces of code that provide nice-to-have functionality but not necessary (i.e., optional) functionality. In such a web hosted technological environment, high availability, responsiveness, and customizability are increasingly desirable and problematic in the prior art. For example, it is desirable to customize software such that premium users/customers have access to different functionality compared to that of standard customers who in turn may have different functionality compared to that of free/university users. Similarly, it may be desirable to temporarily reduce application functionality to all or a subset of users based on execution conditions (e.g., bandwidth, processor consumption, type of media consumption, time of day, etc.).

Prior art systems may hard code the different functionality into the application itself such that any user that is a member of a predefined entitlement category is provided access to a particular version of an application (e.g., a "premium" version). However, such hard coding into the application itself is limiting and fails to provide flexibility and customizability. In addition, such hard coding and categorization of classes of customers/users requires substantial manual selection of both the functionality and conditions upon which such functionality is enabled.

In view of the limitations of the prior art, it is desirable to have an application with customizable functionality that is optimized based on execution conditions and prior manual functionality configuration.

SUMMARY OF THE INVENTION

Embodiments of the invention overcome the problems of the prior art by utilizing feature flags that are associated with certain application functionality (e.g., pieces of code) such that the functionality will be performed (i.e., will execute) when the evaluation of the feature flag returns true and will be skipped with the value of the feature flag returns false. The "values" to determine whether a feature flag will return true or false are not embedded in the code that a developer writes. Instead, in one or more embodiments, the values are managed from a web portal that is accessible to administrators of the application. Further, in one or more embodiments, the values are determined at run time based on machine learning that provides predictive capabilities to determine whether particular application functionality should execute.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
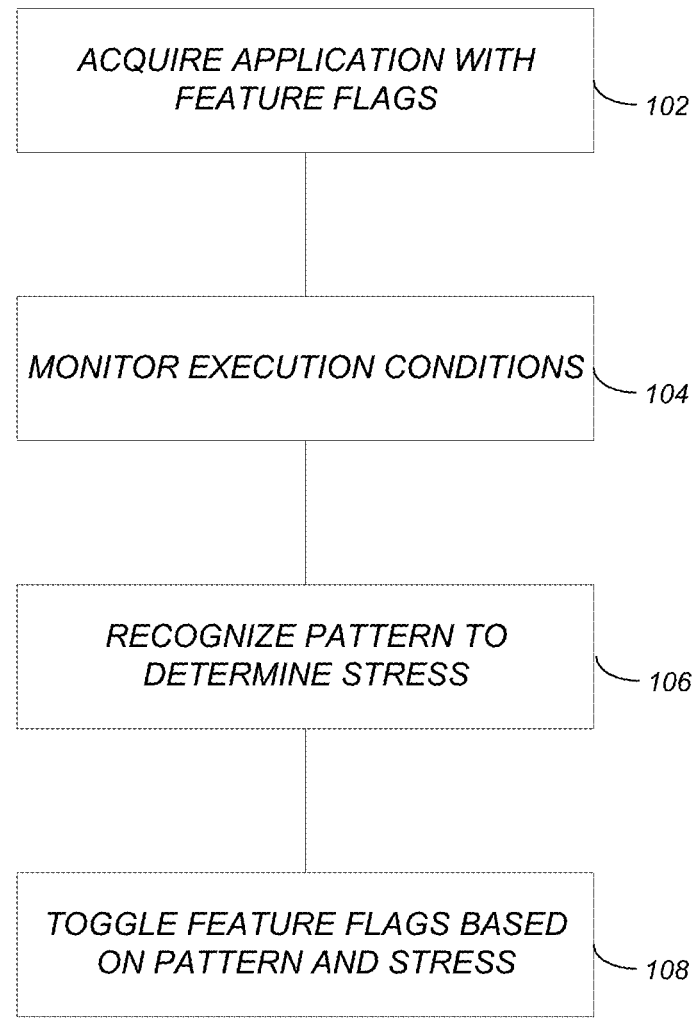
FIG. 1 illustrates the logical flow for optimizing execution of an application in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Execution Optimization Details

Applications have an ever-increasing number of web-hosted technologies that require high availability and responsiveness. Maintaining high availability and responsiveness is difficult but embodiments of the invention provide a tool as a solution to such problems. Specifically, embodiments of the invention utilize feature flags (FFs). Using FFs, a developer can flag certain pieces of code so that they will execute when the evaluation of a FF returns true and will be skipped when the value of a FF returns false. The "values" to determine whether a FF will return true or false are not embedded in the code that a developer writes. In one or more embodiments, the values may be managed from a web portal that is accessible to administrators. In this regard, the prior art requires that any potential FF values be set via manual process.

Embodiments of the invention utilize feature flags to perform various interesting functions. For example, in the FUSION 360 integrated computer aided design (CAD), computer aided manufacturing (CAM), and computer aided engineering (CAE) software (available from the assignee of the present application), a user may create three-dimensional (3D) models and version the model over time. Each time the model is saved to the cloud, a 3D viewable for the model may be generated. The 3D viewable is a light-weight representation of the model that is used only for viewing purposes. The viewable is a nice-to-have but not entirely necessary (i.e., it is optional). The FUSION application (as well as other applications) have many pieces of code that provide optional nice-to-have functionality that is not necessary. Embodiments of the invention associate FFs with such optional nice-to-have functionality. If the FF evaluates to true, such functionality is executed/available, and if the FF evaluates to false, the functionality is not executed/enabled. Further, as described herein, the values that determine true vs. false may be web-accessible but not directly built into the code.

In additional embodiments, it may be desirable to set FF values (that are associated with particular functions [e.g., optional nice-to-have functions]) to false when a system (e.g., a system utilizing cloud-based services) is under stress. For example, stress may result from high user usage at peak times in the day, an unexpected spike in the number of users, some services being down, etc. In embodiments of the invention, an overall system may be monitored through various means to determine when a system is under stress. Such monitoring may be performed via machine learning. For example, a machine learning module may monitor the state of a cloud based services system (e.g., AUTODESK CLOUD) looking for stress, turning off non-essential cloud services in times of stress. and turning on non-essential cloud services when the system is stress free. In this regard, embodiments of the invention associate FF with particular functions, have the ability to monitor system operations (e.g., looking for stress), and have the ability to toggle on/off values in the FF based on such monitoring.

Further to the above, embodiments of the invention may not be limited to non-essential services, nor does it need to be a an all of nothing toggle. In this regard, functionality for non-paying users may be temporarily turned off so that premium, paying customers always experience good throughput for their jobs. In addition, the machine learning may determine an order or precedent for multiple FF associated with users or a group. For example, FF may be implemented across teams not collocated as well as across different locations. Further, based on the monitoring, the machine learning module may determine patterns in use and the ability to set FF in an efficient manner.

Figure 2:
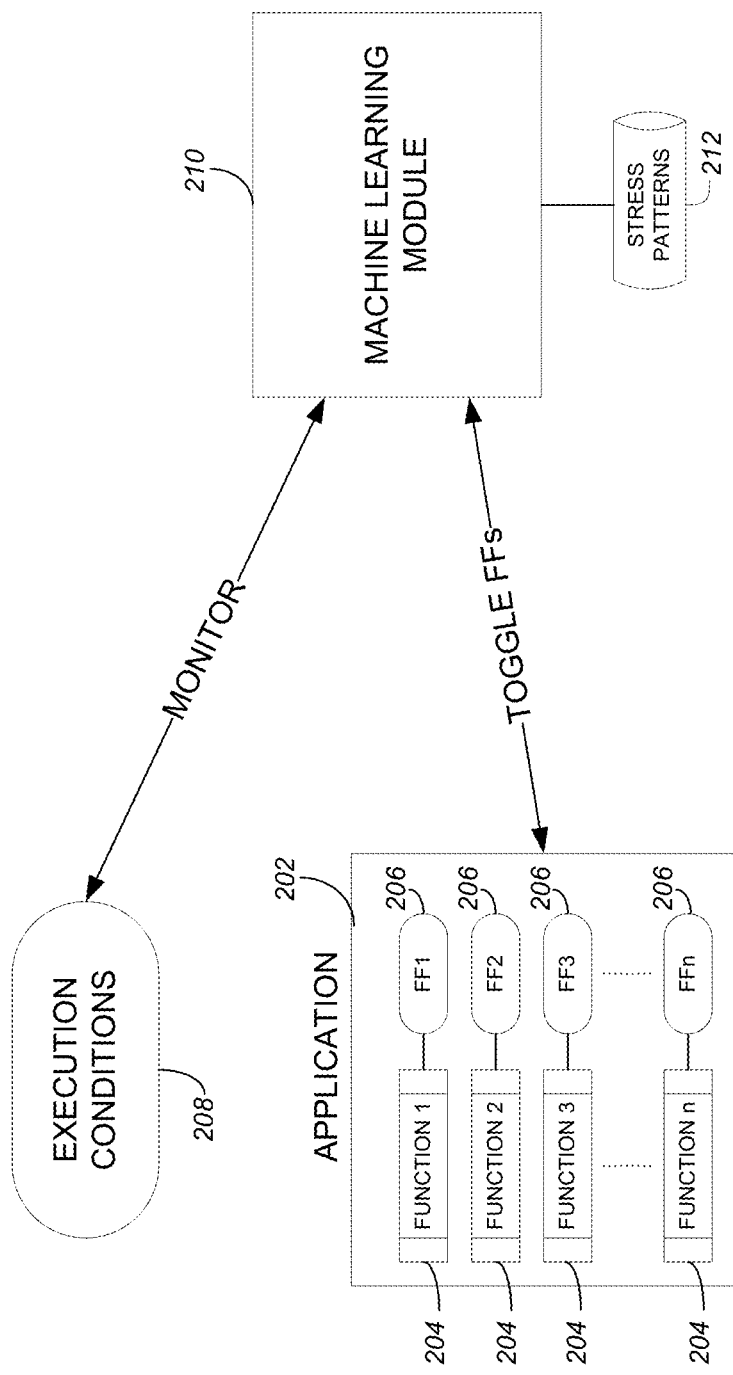
FIG. 2 is a system-level diagram for a system that can be used to optimize execution of an application in accordance with one or more embodiments of the invention.

FIG. 1 illustrates the logical flow for optimizing execution of an application in accordance with one or more embodiments of the invention. The flow of FIG. 1 may be conducted using the components illustrated in FIG. 2. In this regard, FIG. 2 is a system-level diagram for a system that can be used to optimize execution of an application in accordance with one or more embodiments of the invention.

At step 102, an application 202 is acquired (via a processor in a computer). The application includes two or more functions 204 and each of the functions 204 has a corresponding feature flag 206. Each feature flag 206 determines whether the corresponding function 204 is executed.

At step 104, execution conditions 208 of execution of the application 202 are monitored, in/via a machine learning module 210 executed by the processor, at run-time.

At step 106, a pattern 212 relating to the execution conditions is recognized/determined in order to determine a stress relating to the execution of the application 202.

At step 108, during executing of the application 202, one or more of the feature flags 206 are toggled based on the pattern 212 and the stress such that the corresponding functions 204 do not execute. The values used to toggle the feature flags 206 may be managed from/via a web portal. Further, the corresponding functions 204 that do not execute may include/consist of non-essential cloud services. In addition, the machine learning module 210 may toggle the feature flags 206 further based on a time of day and/or based on a prediction of when the execution of the application will undergo the stress.

In view of the above, embodiments of the invention may be configured to grant/enable access to functionality based on a user profile. For example, embodiments may grant/enable access to functionality to premium user/customers while restricting/limiting such access to non-premium users. In this regard, different characteristics may be used to determine whether to toggle a feature flag. Such characteristics may include the time of day (e.g., the machine learning module may determine that users use a particular software module during a particular time of day), type of work, industry, experience of users, types of features (e.g., extensive cloud based rendering/modeling versus local operations), etc. Such an enablement of functionality may be granted on a temporary basis during a time of stress or based on other arbitrary standards that may be defined by a user/determined by the machine learning module.

As an example of the use of embodiments of the invention, during normal circumstances/execution conditions, all users may have the ability to generate thumbnail images. However, when experiencing a high load (e.g., a load the exceeds a threshold load value), it may be desirable to restrict the generation of such thumbnails. The machine learning module may determine/predict the stressful conditions (e.g., when the system is about to go under stress), and toggle the feature flags thereby disabling the generation of thumbnail images functionality, and then toggling such functionality back on when the load decreases to within normal threshold limits. Accordingly, the machine learning module enables an automated mechanism (e.g., without user input) for adjusting functionality in an application at run-time based on a variety of conditions (e.g., user profile and stress). Such machine learning monitoring provides a predictive capability such that a system remains resilient even when stressful execution conditions occur (i.e., the system will not fail as enabled functionality is simply reduced such that the system continues to provide essential features to the desire user/customer base).

Further to the above, in a system that utilizes extensive cloud services, embodiments of the invention may act as a gate-keeper such that downstream applications may be toggled during periods of stress or to counteract a predictive stressful event.

Hardware Embodiments

Figure 3:
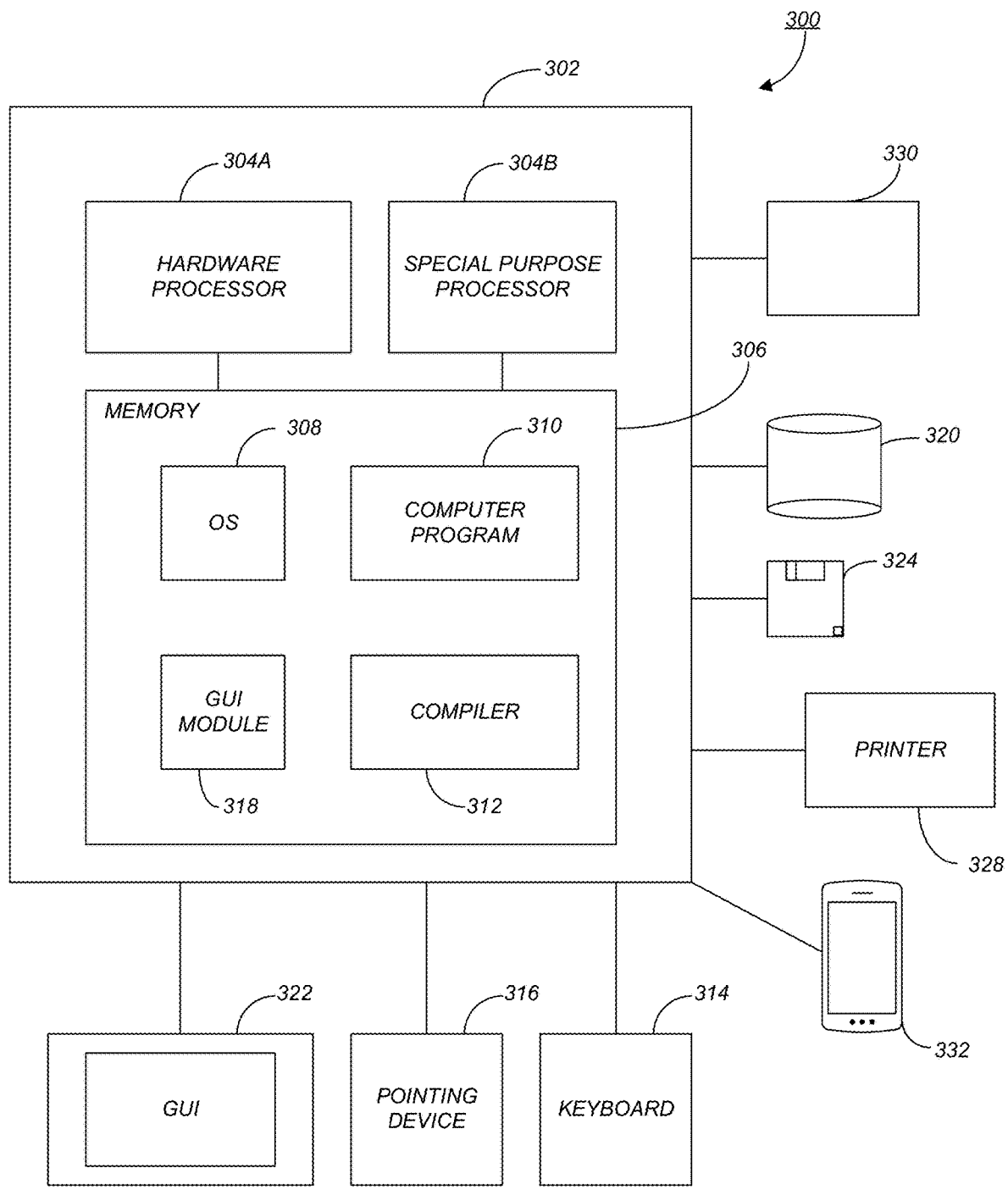
FIG. 3 is an exemplary hardware and software environment used to implement one or more embodiments of the invention.

FIG. 3 is an exemplary hardware and software environment 300 used to implement one or more embodiments of the invention. The hardware and software environment includes a computer 302 and may include peripherals. Computer 302 may be a user/client computer, server computer, or may be a database computer. The computer 302 comprises a hardware processor 304A and/or a special purpose hardware processor 304B (hereinafter alternatively collectively referred to as processor 304) and a memory 306, such as random access memory (RAM). The computer 302 may be coupled to, and/or integrated with, other devices, including input/output (I/O) devices such as a keyboard 314, a cursor control device 316 (e.g., a mouse, a pointing device, pen and tablet, touch screen, multi-touch device, etc.) and a printer 328. In one or more embodiments, computer 302 may be coupled to, or may comprise, a portable or media viewing/listening device 332 (e.g., an MP3 player, IPOD, NOOK, portable digital video player, cellular device, personal digital assistant, etc.). In yet another embodiment, the computer 302 may comprise a multi-touch device, mobile phone, gaming system, internet enabled television, television set top box, or other internet enabled device executing on various platforms and operating systems.

In one embodiment, the computer 302 operates by the hardware processor 304A performing instructions defined by the computer program 310 under control of an operating system 308. The computer program 310 and/or the operating system 308 may be stored in the memory 306 and may interface with the user and/or other devices to accept input and commands and, based on such input and commands and the instructions defined by the computer program 310 and operating system 308, to provide output and results.

Output/results may be presented on the display 322 or provided to another device for presentation or further processing or action. In one embodiment, the display 322 comprises a liquid crystal display (LCD) having a plurality of separately addressable liquid crystals. Alternatively, the display 322 may comprise a light emitting diode (LED)

display having clusters of red, green and blue diodes driven together to form full-color pixels. Each liquid crystal or pixel of the display 322 changes to an opaque or translucent state to form a part of the image on the display in response to the data or information generated by the processor 304 from the application of the instructions of the computer program 310 and/or operating system 308 to the input and commands. The image may be provided through a graphical user interface (GUI) module 318. Although the GUI module 318 is depicted as a separate module, the instructions performing the GUI functions can be resident or distributed in the operating system 308, the computer program 310, or implemented with special purpose memory and processors.

In one or more embodiments, the display 322 is integrated with/into the computer 302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 302 according to the computer program 310 instructions may be implemented in a special purpose processor 304B. In this embodiment, some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program 310 instructions. In one embodiment, the special purpose processor 304B is an application specific integrated circuit (ASIC).

The computer 302 may also implement a compiler 312 that allows an application or computer program 310 written in a programming language such as C, C++, Assembly, SQL, PYTHON, PROLOG, MATLAB, RUBY, RAILS, HASKELL, or other language to be translated into processor 304 readable code. Alternatively, the compiler 312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 310 accesses and manipulates data accepted from I/O devices and stored in the memory 306 of the computer 302 using the relationships and logic that were generated using the compiler 312.

The computer 302 also optionally comprises an external communication device such as a modem, satellite link, Ethernet card, or other device for accepting input from, and providing output to, other computers 302.

In one embodiment, instructions implementing the operating system 308, the computer program 310, and the compiler 312 are tangibly embodied in a non-transitory computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of computer program 310 instructions which, when accessed, read and executed by the computer 302, cause the computer 302 to perform the steps necessary to implement and/or use the present invention or to load the program of instructions into a memory 306, thus creating a special purpose data structure causing the computer 302 to operate as a specially programmed computer executing the method steps described herein.

Computer program 310 and/or operating instructions may also be tangibly embodied in memory 306 and/or data communications devices 330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 302.

Figure 4:
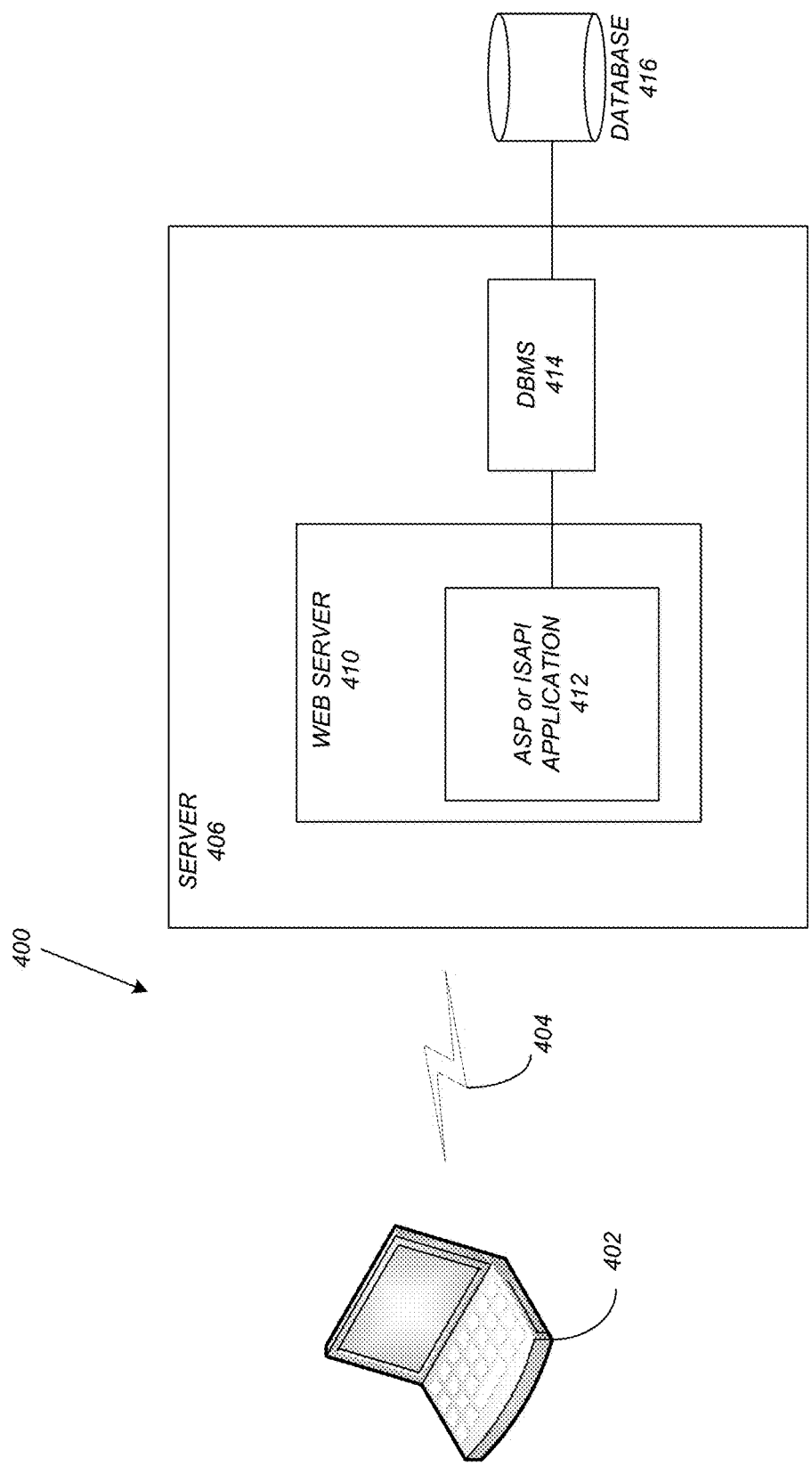
FIG. 4 schematically illustrates a typical distributed/cloud-based computer system using a network to connect client computers to server computers in accordance with one or more embodiments of the invention.

FIG. 4 schematically illustrates a typical distributed/cloud-based computer system 400 using a network 404 to connect client computers 402 to server computers 406. A typical combination of resources may include a network 404 comprising the Internet, LANs (local area networks), WANs (wide area networks), SNA (systems network architecture) networks, or the like, clients 402 that are personal computers or workstations (as set forth in FIG. 3), and servers 406 that are personal computers, workstations, minicomputers, or mainframes (as set forth in FIG. 3). However, it may be noted that different networks such as a cellular network (e.g., GSM [global system for mobile communications] or otherwise), a satellite based network, or any other type of network may be used to connect clients 402 and servers 406 in accordance with embodiments of the invention.

A network 404 such as the Internet connects clients 402 to server computers 406. Network 404 may utilize ethernet, coaxial cable, wireless communications, radio frequency (RF), etc. to connect and provide the communication between clients 402 and servers 406. Further, in a cloud-based computing system, resources (e.g., storage, processors, applications, memory, infrastructure, etc.) in clients 402 and server computers 406 may be shared by clients 402, server computers 406, and users across one or more networks. Resources may be shared by multiple users and can be dynamically reallocated per demand. In this regard, cloud computing may be referred to as a model for enabling access to a shared pool of configurable computing resources.

Clients 402 may execute a client application or web browser and communicate with server computers 406 executing web servers 410. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 402 may be downloaded from server computer 406 to client computers 402 and installed as a plug-in or ACTIVEX control of a web browser. Accordingly, clients 402 may utilize ACTIVEX components/component object model (COM) or distributed COM (DCOM) components to provide a user interface on a display of client 402. The web server 410 is typically a program such as MICROSOFT'S INTERNET INFORMATION SERVER.

Web server 410 may host an Active Server Page (ASP) or Internet Server Application Programming Interface (ISAPI) application 412, which may be executing scripts. The scripts invoke objects that execute business logic (referred to as business objects). The business objects then manipulate data in database 416 through a database management system (DBMS) 414. Alternatively, database 416 may be part of, or connected directly to, client 402 instead of communicating/obtaining the information from database 416 across network 404. When a developer encapsulates the business functionality into objects, the system may be referred to as a component object model (COM) system. Accordingly, the scripts executing on web server 410 (and/or application 412) invoke COM objects that implement the business logic. Further, server 406 may utilize MICROSOFT'S TRANSACTION SERVER (MTS) to access required data stored in database 416 via an interface such as ADO (Active Data Objects), OLE DB (Object Linking and Embedding DataBase), or ODBC (Open DataBase Connectivity).

Generally, these components 400-416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 402 and 406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 402 and 406. Further, embodiments of the invention are implemented as a software application on a client 402 or server computer 406. Further, as described above, the client 402 or server computer 406 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for optimizing execution of an application, comprising:

(a) acquiring, via a processor in a computer, the application, wherein:
 (1) the application comprises two or more functions;
 (2) each of the two or more functions has a corresponding feature flag;
 (3) each feature flag determines whether the corresponding function is executed;
(b) automatically monitoring, without user input in a machine learning module executed by the processor in the computer, execution conditions of execution of the application during run-time, wherein the execution conditions comprise system operations;
(c) automatically recognizing, without user input, in the machine learning module, a pattern relating to the execution conditions to determine a stress relating to the execution of the application;
(d) automatically determining and storing, via the machine learning module, the pattern;
(e) updating, over multiple application executions, via the machine learning module, the pattern, based on the execution conditions;
(f) during execution of the application, automatically predicting based on the pattern via the machine learning module, that the application is about to experience stressful conditions;
(g) based on the automatically predicting, automatically toggling, without user input via the machine learning module, one or more of the feature flags such that the corresponding functions do not execute.

2. The computer-implemented method of claim 1, wherein values utilized to toggle the one or more feature flags are managed from a web portal.

3. The computer-implemented method of claim 1, wherein the corresponding functions that do not execute comprise non-essential cloud services.

4. The computer-implemented method of claim 1, wherein:
the toggling provides that the corresponding functions do not execute when a level of the stress exceeds a threshold;
the method further comprising:
monitoring, via the machine learning module, to determine when the level of the stress is below the threshold; and
toggling, via the machine learning module, the one or more feature flags based on the determining, such that the corresponding functions execute.

5. The computer-implemented method of claim 1, wherein:
the machine learning module toggles the one or more feature flags further based on a user profile.

6. The computer-implemented method of claim 5, wherein:
the user profile comprises an attribute that identifies whether a user is a premium user or another type of user.

7. The computer-implemented method of claim 5, wherein:
the user profile determines a type of work that a user performs using the application.

8. The computer-implemented method of claim 1, wherein:
the machine learning module toggles the one or more feature flags further based on a time of day.

9. The computer-implemented method of claim 1, wherein:

the machine learning module toggles the one or more feature flags further based on a prediction of when the execution of the application will undergo the stress.

10. A computer-implemented system for optimizing execution of an application, comprising:
(a) a computer having a memory;
(b) a processor executing on the computer;
(c) the memory storing an application that is executed by the processor, wherein:
(1) the application comprises two or more functions;
(2) each of the two or more functions has a corresponding feature flag; and
(3) each feature flag determines whether the corresponding function is executed by the processor; and
(d) a machine learning module executed by the processor, wherein the machine learning module:
(1) automatically monitors, without user input, execution conditions of execution of the application at run-time;
(2) automatically recognizes, without user input a pattern relating to the execution conditions to determine a stress relating to the execution of the application, wherein the execution conditions comprise system operations;
(3) automatically determines and stores the patterns;
(4) update, over multiple application executions, the pattern, based on the execution conditions;
(5) during execution of the application, automatically predicts based on the pattern t to experience stressful conditions;
(6) based on the automatically predicting, automatically toggles, without user input, one or more of the feature flags such that the corresponding functions do not execute.

11. The computer-implemented system of claim 10, wherein values utilized to toggle the one or more feature flags are managed from a web portal.

12. The computer-implemented system of claim 10, wherein the corresponding functions that do not execute comprise non-essential cloud services.

13. The computer-implemented system of claim 10, wherein the machine learning module:
determines that the corresponding functions do not execute when a level of the stress exceeds a threshold;
monitors to determine when the level of the stress is below the threshold; and
toggles the one or more feature flags based on the determination of the level of stress, such that the corresponding functions execute.

14. The computer-implemented system of claim 10, wherein:
the machine learning module toggles the one or more feature flags further based on a user profile.

15. The computer-implemented system of claim 14, wherein:
the user profile comprises an attribute that identifies whether a user is a premium user or another type of user.

16. The computer-implemented system of claim 14, wherein:
the user profile determines a type of work that a user performs using the application.

17. The computer-implemented system of claim 10, wherein:
the machine learning module toggles the one or more feature flags further based on a time of day.

18. The computer-implemented system of claim 10, wherein:
the machine learning module toggles the one or more feature flags further based on a prediction of when the execution of the application will undergo the stress.

* * * * *